(12) United States Patent
Ford

(10) Patent No.: US 6,675,525 B1
(45) Date of Patent: Jan. 13, 2004

(54) DISPOSABLE, BUOYANT SCENTED LURE

(76) Inventor: James R. Ford, 1465 Brush Creek Rd., Kingston Springs, TN (US) 37082

( * ) Notice: Subject to any disclaimer, the term of this patent is extended or adjusted under 35 U.S.C. 154(b) by 0 days.

(21) Appl. No.: 10/209,916

(22) Filed: Aug. 2, 2002

(51) Int. Cl.⁷ .............................................. A01K 85/01
(52) U.S. Cl. .................... 43/42.24; 43/42.06; 43/42.35; 43/42.36; 43/42.05; 43/42.53
(58) Field of Search .......................... 43/42.06, 42.24, 43/42.28, 42.22, 42.35, 42.36, 42.05, 42.53, 41, 41.2

(56) References Cited

U.S. PATENT DOCUMENTS

| | | | | |
|---|---|---|---|---|
| 1,010,481 A | * | 12/1911 | Crane et al. ................ | 43/42.06 |
| 1,249,194 A | * | 12/1917 | Race ........................... | 43/42.06 |
| 1,612,264 A | * | 12/1926 | Cressey ....................... | 43/42.28 |
| 1,764,738 A | * | 6/1930 | Marsters ..................... | 43/41.2 |
| 2,102,739 A | * | 12/1937 | Peters ......................... | 43/42.24 |
| 2,112,385 A | * | 3/1938 | Smith .......................... | 43/42.35 |
| 2,129,245 A | * | 9/1938 | Stenstrom ................... | 43/42.06 |
| 2,218,280 A | * | 10/1940 | Deering ...................... | 43/42.35 |
| 2,497,846 A | * | 2/1950 | Burroughs ................... | 43/42.06 |
| 2,555,088 A | * | 5/1951 | Irwin .......................... | 43/42.06 |
| 2,572,608 A | * | 10/1951 | Gabor ......................... | 43/42.24 |
| 2,592,445 A | * | 4/1952 | McCarthy ................... | 43/42.53 |
| 2,618,093 A | * | 11/1952 | Isaac .......................... | 43/42.22 |
| 2,674,058 A | * | 4/1954 | Lindenberg ................. | 43/42.06 |
| 2,691,841 A | * | 10/1954 | Daniel ........................ | 43/42.06 |
| 2,703,945 A | * | 3/1955 | Johnson ...................... | 43/42.06 |
| 2,796,605 A | * | 6/1957 | Ashley ........................ | 43/42.24 |
| 2,817,922 A | * | 12/1957 | Takeshita .................... | 43/42.28 |
| 2,820,315 A | * | 1/1958 | Lowe .......................... | 43/42.35 |
| 2,827,376 A | * | 3/1958 | Breuer ........................ | 43/42.06 |
| 2,869,279 A | * | 1/1959 | Pretorius ..................... | 43/42.06 |
| 2,922,246 A | * | 1/1960 | Mileschuk ................... | 43/42.06 |
| 3,047,975 A | * | 8/1962 | Pretorius ..................... | 43/42.06 |
| 3,108,389 A | * | 10/1963 | McGuire ..................... | 43/42.06 |
| 3,303,596 A | * | 2/1967 | Lewis et al. ................. | 43/41.2 |
| 3,449,853 A | * | 6/1969 | Shearer ....................... | 43/42.24 |
| 3,505,755 A | * | 4/1970 | Pearce ........................ | 43/42.06 |
| 3,526,988 A | * | 9/1970 | Young ........................ | 43/42.53 |
| 3,685,192 A | * | 8/1972 | Stibbard ..................... | 43/42.24 |
| 3,688,430 A | * | 9/1972 | Balch ......................... | 43/42.06 |
| 3,753,309 A | * | 8/1973 | Bryant ........................ | 43/41.2 |
| 3,760,528 A | * | 9/1973 | Moore ........................ | 43/42.24 |
| 3,828,463 A | * | 8/1974 | Perrin ......................... | 43/42.28 |

(List continued on next page.)

FOREIGN PATENT DOCUMENTS

| | | | | |
|---|---|---|---|---|
| FR | 344908 B1 | * | 9/1904 | ............... 43/42.06 |
| FR | 1050123 B1 | * | 8/1953 | |
| FR | 1150413 B1 | * | 8/1957 | ............... 43/42.24 |
| FR | 2782895 B1 | * | 3/2000 | |
| GB | 2310349 | | 8/1997 | |
| JP | 2001-45919 B1 | * | 2/2001 | |
| JP | 2001-69876 B1 | * | 3/2001 | |
| JP | 2001-69877 B1 | * | 3/2001 | |
| JP | 2003-61518 B1 | * | 3/2003 | |
| JP | 2003-144013 B1 | * | 5/2003 | |

*Primary Examiner*—Darren W. Ark
(74) *Attorney, Agent, or Firm*—Richard C. Litman

(57) ABSTRACT

A disposable, buoyant, scented fishing lure is formed of a soft, resilient, economically disposable plastic material, with a hollow chamber formed within the lure body. A fish attractant scent material and flotation element are placed within the lure body chamber. The float may be coated or otherwise treated with the scent material prior to installation within the lure, to install the scent material therein. The chamber, with the scent material and float installed therein, is then hermetically sealed to prevent escape of the scent therefrom. When the lure is to be used, the angler installs a fish hook therein and penetrates the scent and float chamber with the hook. This allows the scent material to be released gradually from the lure through the passages formed by the hook insertion in the lure. Once the scent material has substantially dissipated, the angler may discard the used lure for a fresh one.

20 Claims, 4 Drawing Sheets

U.S. PATENT DOCUMENTS

| | | | | |
|---|---|---|---|---|
| 3,854,234 A | * | 12/1974 | Hardin | 43/42.06 |
| 3,916,556 A | * | 11/1975 | Armanno | 43/42.06 |
| 3,921,328 A | * | 11/1975 | Holcombe | 43/42.06 |
| 3,953,934 A | | 5/1976 | Visser | 43/42.06 |
| 3,958,357 A | * | 5/1976 | Frank | 43/42.06 |
| 3,964,203 A | | 6/1976 | Williams, Jr. | 43/42.06 |
| 3,969,840 A | | 7/1976 | Charron | 43/42.06 |
| 3,971,152 A | * | 7/1976 | Husson, Jr. | 43/42.06 |
| 3,987,575 A | | 10/1976 | Morita | 43/42.06 |
| 3,991,504 A | * | 11/1976 | Pieper | 43/42.06 |
| 4,023,300 A | * | 5/1977 | Vieths | 43/41.2 |
| 4,060,925 A | * | 12/1977 | Bias | 43/42.35 |
| 4,197,667 A | * | 4/1980 | Helfenstine et al. | 43/42.06 |
| 4,214,397 A | * | 7/1980 | Kent | 43/42.28 |
| 4,242,827 A | * | 1/1981 | Smith | 43/42.24 |
| 4,257,182 A | * | 3/1981 | Thom | 43/42.06 |
| 4,314,420 A | | 2/1982 | Dickinson et al. | 43/42.39 |
| 4,530,179 A | | 7/1985 | Larew | 43/42.06 |
| 4,553,348 A | | 11/1985 | Cooper | 43/42.06 |
| 4,589,223 A | | 5/1986 | Hastings | 43/42.24 |
| 4,638,586 A | * | 1/1987 | Hall | 43/42.28 |
| 4,689,914 A | * | 9/1987 | Quinlan | 43/42.35 |
| 4,736,542 A | | 4/1988 | Floyd | 43/42.06 |
| 4,741,120 A | * | 5/1988 | Cota et al. | 43/42.53 |
| 4,790,100 A | * | 12/1988 | Green, Sr. | 43/42.28 |
| 4,799,328 A | * | 1/1989 | Goldman | 43/42.06 |
| 4,843,754 A | * | 7/1989 | Spelts | 43/42.28 |
| 4,893,431 A | * | 1/1990 | Ehlers | 43/42.35 |
| 4,922,646 A | * | 5/1990 | Basgal | 43/42.36 |
| 4,953,319 A | * | 9/1990 | Kasper et al. | 43/42.06 |
| 4,993,183 A | | 2/1991 | Carver | 43/42.06 |
| 4,998,370 A | * | 3/1991 | Lawler et al. | 43/42.06 |
| 5,018,297 A | * | 5/1991 | Kennedy, Jr. | 43/42.06 |
| 5,113,614 A | | 5/1992 | Morita | 43/42.74 |
| 5,142,811 A | * | 9/1992 | Freeman | 43/42.06 |
| 5,152,094 A | * | 10/1992 | Strickland | 43/42.36 |
| 5,216,829 A | | 6/1993 | Morton | 43/42.06 |
| 5,228,230 A | * | 7/1993 | Vaught | 43/42.28 |
| 5,253,447 A | | 10/1993 | Rhinehart | 43/42.74 |
| 5,299,378 A | * | 4/1994 | Ballard | 43/42.06 |
| 5,303,499 A | | 4/1994 | Miller | 43/43.15 |
| 5,335,443 A | * | 8/1994 | Grigsby, Jr. | 43/43.14 |
| 5,379,544 A | * | 1/1995 | Davidson | 43/42.24 |
| 5,444,935 A | | 8/1995 | Pahle | 43/42.06 |
| 5,471,780 A | | 12/1995 | Hopson | 43/42.06 |
| 5,517,781 A | * | 5/1996 | Paoletta, Jr. | 43/42.06 |
| 5,555,668 A | | 9/1996 | Brasseur | 43/43.15 |
| 5,725,892 A | * | 3/1998 | Gibbs | 43/42.53 |
| 5,729,928 A | | 3/1998 | Anderson | 43/44.99 |
| 5,893,231 A | * | 4/1999 | Kato | 43/42.24 |
| 5,943,811 A | * | 8/1999 | Packer | 43/42.06 |
| 5,996,271 A | * | 12/1999 | Packer | 43/42.06 |
| 6,041,538 A | * | 3/2000 | Roemer | 43/42.06 |
| 6,192,616 B1 | * | 2/2001 | Kent | 43/42.06 |
| 6,192,617 B1 | | 2/2001 | Lyles | 43/42.06 |
| 6,393,756 B1 | * | 5/2002 | Forney et al. | 43/42.06 |
| 6,546,663 B1 | * | 4/2003 | Signitzer et al. | 43/42.24 |
| 6,560,915 B2 | * | 5/2003 | Downey | 43/42.36 |

* cited by examiner

DISPOSABLE, BUOYANT SCENTED LURE

BACKGROUND OF THE INVENTION

1. Field of the Invention

The present invention relates generally to fishing tackle and equipment, and more particularly to a disposable lure having a fish attracting scent therewith. The present lure contains a buoyant element therein, providing for the lure to be positioned at a predetermined depth above the bottom or below the surface of the body of water in which it is used, depending upon the length of the depending weighted leader.

2. Description of the Related Art

The activity of fishing has become more sophisticated over the years, as anglers have continually learned more about the sport. Initially, anglers used natural fish foods (worms, insects, minnows, etc.) as bait, all of which work fairly well, but which have their drawbacks. The use of any live or recently killed natural prey, leads to acquisition and storage problems for the angler. It is always easier to attain and retain an artificial lure, than to attain and retain natural bait (minnows, etc.) for fish, and to keep that natural bait in a fresh state.

As a result, the artificial lure was developed. Such artificial lures have a myriad of different configurations, ranging from flies made of plastic, bird feathers or down, etc. for fly fishing, to various types of wood and plastic plugs and other lures which are intended to at least loosely resemble a large insect, tadpole, or other prey commonly eaten by many types of fish.

A universal problem with such artificial lures, is that they do not emanate the scent of a natural bait organism. Fish often rely heavily upon the sense of scent in order to find food, with scent being more heavily relied upon at relatively greater distances and among fish species which frequent dark and/or murky waters. A fish which is primarily attracted to food or prey by the scent given off by that prey, will not seek out an unnaturally scented or unscented artificial lure by means of the sense of scent.

Accordingly, anglers began to treat artificial lures with various scents intended to attract fish, such as various types of oils and the like attained from other fish, etc. Many artificially developed scents have also been developed, which have been found to be attractive to fish. The combination of a lure which emits a fish attractive scent, to lure fish from a relatively great distance from the lure, and a lure having a visually attractive appearance to the fish to attract the fish at relatively closer range, has resulted in much greater success for the angler, when all other factors are equal.

However, the scents which are generally attractive to fish, are often at least somewhat repellent to humans. The need to open a container of scent and treat the lure with the scent in some manner, is generally regarded as a less than pleasant task for the angler. This led to lures which were pretreated with a scent material. However, the scent was not sealed within the lure, so the same problem of the lure emitting a scent which was undesirable to the angler, still existed.

Anglers have also found that different species of fish tend to prefer different types of water conditions, and different levels in a given body of water as well. For example, bass tend to live in relatively still waters, generally with some type of vegetation or the like growing on the bottom. Bass are a very popular game fish for the angler, and accordingly, anglers have sought to develop lures and equipment which are suited for such an environment.

Ideally, a lure intended for bass (or other fish having similar habits) would emit a fish attractive scent, as fish adapted to such conditions rely heavily upon scent to locate their prey. The lure should not float upon the surface, as bass and other fish with similar habits do not generally feed upon the surface. However, the lure should not sink to the bottom either, but should seek some level above the bottom, clear of weeds and/or other obstructions on the bottom of the body of water. Finally, the scent with which the lure is treated, should remain sealed until the lure is used, with the lure being economically disposable after a single use in order to minimize exposure to the scent material.

The present disposable, buoyant scented lure responds to each of the above needs, while conventional lures developed in the past fail to achieve one or more of the above aspects. A discussion of the related art of which the present inventor is aware, and its differences and distinctions from the present invention, is provided below.

U.S. Pat. No. 3,688,430 issued on Sep. 5, 1972 to Duane C. Balch, titled "Fishing Lure," describes a few different embodiments of a lure comprising a flexible pouch with a slit along one side, somewhat like a conventional coin purse for carriage in a pocket. The hook and leader are installed along the bottom of the slit, with the leader passing through the pouch. Additional passages may be provided in the pouch in order for the scent of the bait contained therein to be emitted into the surrounding water during use. In one embodiment, the scent is sealed within a frangible container within the pouch. In contrast, the present scented lure is completely sealed until use, with the angler inserting the hook through the side of the lure and through the otherwise sealed scent containing area in order to allow the scent to escape therefrom. Moreover, the present lure is buoyant, economically disposable, and may include means for suspending the lure at a predetermined distance above the bottom or below the surface of the body of water in which it is used. Balch is silent regarding these features.

U.S. Pat. No. 3,953,934 issued on May 4, 1976 to Melvin J. Visser, titled "Odoriferous Fishing Device," describes the impregnation of a sintered metal device (i.e., a powdered metal which has been processed to form a body with a myriad of minute porosities therein) with a material which has a scent which attracts fish. The basic structure of the device is the same as that of an Oilite® bearing, but rather than impregnating the sintered metal with lubricating oil, a material having a fish attracting scent is used. No sealing of the scent within the lure before use is disclosed by Visser, nor is the method of installing a hook in the device for breaking the sealed capsule, as provided by the present invention. Visser also does not provide flotation for his lure.

U.S. Pat. No. 3,964,203 issued on Jun. 22, 1976 to William O. Williams, Jr., titled "Fishing Lure," describes the use of a strip of chamois material which has been impregnated with animal blood, fish oil, and/or other fish attracting material. Williams, Jr. installs a hook through the flat piece of chamois, or, alternatively attaches the chamois to the hook of an existing lure. Williams, Jr. does not disclose any means of sealing the scent within the exposed chamois material prior to installing a hook therein for use, nor does he describe any inherent buoyancy or flotation for his chamois lure. The present lure seals the scent producing material therein until it is punctured by a hook immediately prior to use, and is also buoyant in order to be used at any desired depth, depending upon the associated tackle.

U.S. Pat. No. 3,969,840 issued on Jul. 20, 1976 to John R. E. Charron, titled "Fishing Lure," describes a series of lure embodiments, each having a tubular body with a separable closure. The hollow body is used to contain various materials which producer a scent which attracts fish. In some embodiments, the cap or closure may include a needle which may be used to puncture the hollow body, in order to release the contents of the body. However, the Charron device is not buoyant if pierced, as indicated in column 2, lines 36–37 of the Charron '840 U.S. Patent. Moreover, Charron intends for his lure to be reusable and to be recharged or refilled with scent material, unlike the economically disposable lure of the present invention. Also, while Charron provides means for the attachment of hooks to his lure body, and in fact installs the shank of a hook through the body in at least some embodiments, he does not use the hook to form the scent releasing apertures, as provided by the present lure invention.

U.S. Pat. No. 3,987,575 issued on Oct. 26, 1976 to Toshio Morita, titled "Fishing Lure," describes a generally conventional lure body having a series of external hooks essentially permanently attached thereto. The lure body includes a hollow interior, into which a scent containing capsule may be installed and closed therein. The Morita disclosure describes the use of a needle to puncture the capsule within the lure body, as the hooks cannot be used for such due to their external attachment to the lure body. Moreover, the Morita lure is not economically disposable, and no buoyancy is described.

U.S. Pat. No. 4,314,420 issued on Feb. 9, 1982 to Robert J. Dickinson et al., titled "Fishing Device," describes a wire assembly for elevating bait or a lure above the bottom of a body of water, when fishing. The Dickinson et al. device basically comprises a weighted, V-shaped trailing wire with an L-shaped wire extending vertically upwardly therefrom. The upper, distal end of the L-shaped wire is equipped with a fish hook. No lure or fish attracting scent is disclosed by Dickinson et al. The Dickinson et al. device may be considered generally of the group called "Carolina rigs," which support bait or a lure above the bottom. The present scented lure may be attached to such a rig or tackle, as desired. However, the supporting tackle required for the present lure is considerably simpler than the Dickinson et al. device, due to the buoyancy of the present lure.

U.S. Pat. No. 4,530,179 issued on Jul. 23, 1985 to Eugene T. Larew, titled "Salt Impregnated Fishing Lure," describes a method of mixing finely divided table salt (sodium chloride) with the uncured liquid resins of which the lure body is made, prior to heating and curing the lure body plastic. The resulting lure has a salty taste, which is said to cause a fish to retain the lure in the fish's mouth for a longer period of time, thereby allowing the angler more time to set the hook. However, the salt impregnation does nothing to provide a scent to attract a fish to the lure in the first place, and in fact, Larew states in col. 4, lines 10–13, that he prefers that the lure not be scented, as he believes that such scent would mask the salty taste of the lure.

U.S. Pat. No. 4,553,348 issued on Nov. 19, 1985 to Raymond M. Cooper, titled "Fishing Lure," describes a rigid lure body having a series of hooks permanently attached thereto and extending therefrom, a hollow interior, a sliding closure panel, and a series of inlet and outlet passages therethrough. A scented bait may be placed within the hollow body, with the passages providing water flow through the body to wash the scent therefrom and attract fish. The Cooper lure thus more closely resembles the lure of the Morita '575 U.S. Patent, discussed further above, than it does the present disposable scented lure invention.

U.S. Pat. No. 4,589,223 issued on May 20, 1986 to John D. Hastings, titled "Fishing Lure Composition," is primarily directed to a method of making a fish attracting composition, describing ingredients and proportions therefor. While Hastings also discloses a specific lure configuration and indicates that the hook passes through the relatively soft material of the scented lure body, he does not specifically provide for flotation of his lure body. Hastings notes that the specific gravity of the preferred plastic material of which his lure body is formed is 0.96 (column 2, line 51), which is insufficient to support a hook imbedded therein and a leader extending therefrom. Also, the Hastings lure emits its scent at all times, and is not sealed before use, as is the present scented lure.

U.S. Pat. No. 4,736,542 issued on Apr. 12, 1988 to John F. Floyd, titled "Scented Fishing Lure," describes a plug formed of natural or synthetic fibers, and cured by applying a resin thereto. The plug is soaked in a fish attracting scent material, which wicks into the porous plug. The Floyd scented lure is homogeneous throughout, and does not include any form of exterior seal to prevent the scent from dissipating from the lure. In contrast, the present scented lure is sealed until immediately prior to use, whereupon the insertion of a fish hook into the device, punctures the scent chamber to allow the scent to emanate therefrom. Also, Floyd makes no statement regarding buoyancy, but it is well known that hard polymeric resins are generally more dense than water.

U.S. Pat. No. 4,993,183 issued on Feb. 19, 1991 to Robert G. Carver, titled "Banana Oil Impregnated Fishing Lures," describes the mixing of a relatively small amount of banana oil with the soft plastic used for forming a fishing lure. Carver states that fish are attracted to the banana oil scent emitted by the lure and that fish will tend to retain the lure in the mouth for a longer period of time, than with lures not treated in such a manner. Carver also describes the topical coating of the lure with a banana oil mix, as well as molding such an oil into the plastic at the time of molding the plastic. However, Carver does not provide a sealed chamber which retains all of the scent or chemical therein until it is punctured immediately before use, and he is silent regarding buoyancy or economical disposal of his lure after a single use, which features are a part of the present lure.

U.S. Pat. No. 5,113,614 issued on May 19, 1992 to Toshio Morita, titled "Fishing Line Device," describes a float assembly for suspending the distal hooked end of a fishing line in a body of water. The Morita device essentially comprises an elongate wire which is suspended from a float at its center point. The fishing line extends generally along the wire, with the hook and non-buoyant bait or lure suspended from the distal end of the line. The Morita assembly cannot hold the bait or lure at some predetermined distance above the bottom, as there is no reference from the bottom due to the float assembly, and the bait or lure itself is not buoyant. No disclosure of any form of scent dispersion from the lure is provided in the Morita '614 U.S. Patent.

U.S. Pat. No. 5,216,829 issued on Jun. 8, 1993 to Peter Morton, titled "Fish Bait," describes a bait assembly comprising a quantity of bait wrapped in a porous fabric sleeve, which is coated with a semi-permeable membrane. Morton states that the membrane allows the scent of the bait to pass therethrough, which is not desired in the present fishing lure and bait scent. The present invention completely seals the scent within a chamber within the lure body, until the chamber is punctured or broken by the angler immediately before use. In this manner, the scent (which is normally undesirable to humans) is completely contained within the chamber, and cannot be detected prior to using the lure and bait.

U.S. Pat. No. 5,253,447 issued on Oct. 19, 1993 to Lavern R. Rhinehart, titled "Bottom Bouncer Jig For Walleyes," describes a wire assembly wherein one or more sinkers is/are captured along one leg of the wire, with a second leg having a wrap around the first leg to prevent the sinkers from leaving the wire. Rhinehart states that his jig "maintains the presence of the lure or bait at the desired distance from the bottom" (col. 4, lines 29–30). However, he makes no disclosure of any type of lure (buoyant or otherwise), so the specific function of his jig assembly with a lure attached is not clear from his disclosure. In any event, Rhinehart does not disclose any form of scent for a lure, means of applying a scent to a lure, or a scented lure, in his disclosure.

U.S. Pat. No. 5,303,499 issued on Apr. 19, 1994 to Matthew A. Miller, titled "Fishing Device," describes a float having a weight suspended therefrom. The fishing line passes generally horizontally through the float. The float of the Miller assembly does not provide sufficient buoyancy to support the entire apparatus on the surface of the water, but rather supports the fishing line at some predetermined distance above the bottom, depending upon the length of the line supporting the attached weight, as well as the length of the elongate weight itself. Miller is apparently directed to use with a lure having a negative buoyancy, as he does not depend upon the lure itself to provide the desired flotation above the weight. In contrast, the present buoyant lure provides the desired flotation, and no additional float(s) is/are needed.

U.S. Pat. No. 5,444,935 issued on Aug. 29, 1995 to William E. Pahle, titled "Fishing Lure With Jet-Stream Hole And Dried Bait Plugs For Insertion Therein," describes a lure having a longitudinal tubular passage therethrough, and a bait plug having a similar configuration for installation in the lure passage. Pahle states that the bait plug is adapted to dissolve as water washes through the tube of the lure. However, he does not provide any means of sealing the bait plug before installation in the lure, other than providing a waterproof pouch for their carriage. Thus, the angler must handle the exposed bait during installation in the lure. In contrast, the scent of the present scented lure is sealed in a chamber within the lure prior to use, and is not touched by the angler.

U.S. Pat. No. 5,471,780 issued on Dec. 5, 1995 to Lee E. Hopson, titled "Fishing Lure With Rechargeable Container For An Attractant," describes a lure having a removable tube therein, for containing the attractant material. A separate charging container is provided, with which the angler refills the tube within the lure as required. The tubes may be removed in order to allow the angler to use different attractants or scents as desired. This differs from the present invention, in that the present scented lure comprises a sealed chamber which is not breached until immediately before use. Each charge of attractant or scent is completely sealed, and the scent is not replenished, as in other lures having an attractant or scent therewith.

U.S. Pat. No. 5,555,668 issued on Sep. 17, 1996 to Bernard P. Brasseur, titled "Method And Device For Locating Bait At Desired Depth While Fishing," describes what might be loosely considered a "Carolina rig," in that it maintains the lure or bait at a predetermined distance above the bottom of the body of water. However, Brasseur passes the fishing line through the float element, through a generally horizontal tube which extends therethrough. A hook snell or leader extends from the end of the fishing line to the lure or bait and hook. The lure or bait is more dense than water, and sinks to the end of the snell or leader. Thus, Brasseur must take into account the length of the snell as well as the height above the bottom desired, when determining the length of the sinker line. The present invention eliminates this problem, by providing a buoyant lure.

U.S. Pat. No. 5,729,928 issued on Mar. 24, 1998 to Ronald A. Anderson, titled "Bait Fluid Dispensing Apparatus And Method For Crab Traps," describes a cylindrical housing having opposite end caps. One end cap includes a series of orifices therein, for releasing a bait scent contained within the device. The opposite cap is removable for replenishing the contents. No flotation is disclosed, and the FIG. 4 illustration shows the device resting upon the bottom of a crab trap, rather than floating to the top of the trap. Also, no means of attaching a fishing line, lure, or hook to the device is disclosed in the Anderson '928 U.S. Patent, each of which features are a part of the present invention.

U.S. Pat. No. 6,192,617 issued on Feb. 27, 2001 to Adolph L. Lyles, titled "Electronic Fishing Lure Assembly," describes a lure having a cavity therein for installing a scent producing agent of some type. Heating elements are also provided, for heating the scent producing substance in order to promote dissipation of the scent in the water. However, Lyles does not disclose any means of keeping the scent producing material sealed until immediately prior to use, as is done with the present invention. Moreover, Lyles does not disclose any means of holding his lure at a predetermined distance above the bottom of a body of water, as may be accomplished with the present lure. Lyles is silent regarding the density or buoyancy of his lure as well, whereas the present lure is buoyant.

Finally, British Patent Publication No. 2,310,349 published on Aug. 27, 1997 to Julian Woolnough, titled "Fishing Bait Capsule," describes a capsule containing a scent or fish attractant, with the capsule comprising a water soluble shell. The capsule remains sealed until it is immersed in water, whereupon the shell slowly dissolves to release the fish attractant substance. The problem with this approach is that the scent contained within the capsule remains completely sealed therein and is not released for some time after the capsule and associated hook, lure, etc. are lowered into the water. However, once the capsule shell dissolves, the material therein is dissipated into the water all at once. The present scented lure releases the scent material gradually, due to piercing the sealed chamber with the fish hook accompanying the lure.

None of the above inventions and patents, taken either singularly or in combination, is seen to describe the instant invention as claimed. Thus a disposable, buoyant scented lure solving the aforementioned problems is desired.

SUMMARY OF THE INVENTION

The present invention comprises a scented fishing lure, in which the fish attractant scent material is completely sealed within the lure body until immediately before use by the angler. The lure is formed of a soft, resilient plastic material, e.g., a polyvinyl resin or other suitable material, to provide economical disposal after a single use. The lure body includes a hollow cavity or chamber therein, with the fish attractant scent being placed within the lure body cavity before use. A buoyant flotation element may also be placed in the lure body cavity at this time. The scent material and flotation element are then both sealed into the lure cavity, at the time of lure manufacture or thereafter.

When the present lure is to be used, the angler need only insert the hook through the flotation and scent chamber or cavity within the hollow lure body and pass the hook therethrough, in a manner similar to that used in installing a hook in natural bait. The hook penetrates the scent impregnated cavity of the lure, with the scent slowly dissipating from the lure through the holes left by the hook insertion. The present lure may be economically discarded once the fish attracting scent has substantially dissipated from the lure body.

Accordingly, it is a principal object of the invention to provide a buoyant fish lure having a fish attractant scent therein.

It is another object of the invention to provide such a lure which is formed of a soft, resilient plastic material and which has a hollow body chamber or cavity for placement of a fish attractant scent and a flotation element therein.

It is a further object of the invention to seal the fish attractant scent and flotation element within the hollow body chamber or cavity of the lure, precluding escape of the scent prior to using the lure.

Still another object of the invention is to release the fish attracting scent material by installing a fish hook through the lure immediately before using the lure, thereby allowing the scent material to dissipate slowly from the lure by means of the perforations provided by the hook insertion therethrough.

An additional object of the invention is to provide various tackle assemblies for positioning the present lure at a predetermined location above the bottom or on or below the surface of a body of water being fished.

It is an object of the invention to provide improved elements and arrangements thereof for the purposes described which is inexpensive, dependable and fully effective in accomplishing its intended purposes.

These and other objects of the present invention will becomes readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises an inexpensive, economically disposable fishing lure having a fish attractant scent and a flotation element contained within the hollow body of the lure. The present fishing lure provides several advantages over earlier lures of the prior art, due to its inexpensive construction, buoyancy, and the fish attracting scent emitted by the substance sealed therein at the time of manufacture.

Figure 1:
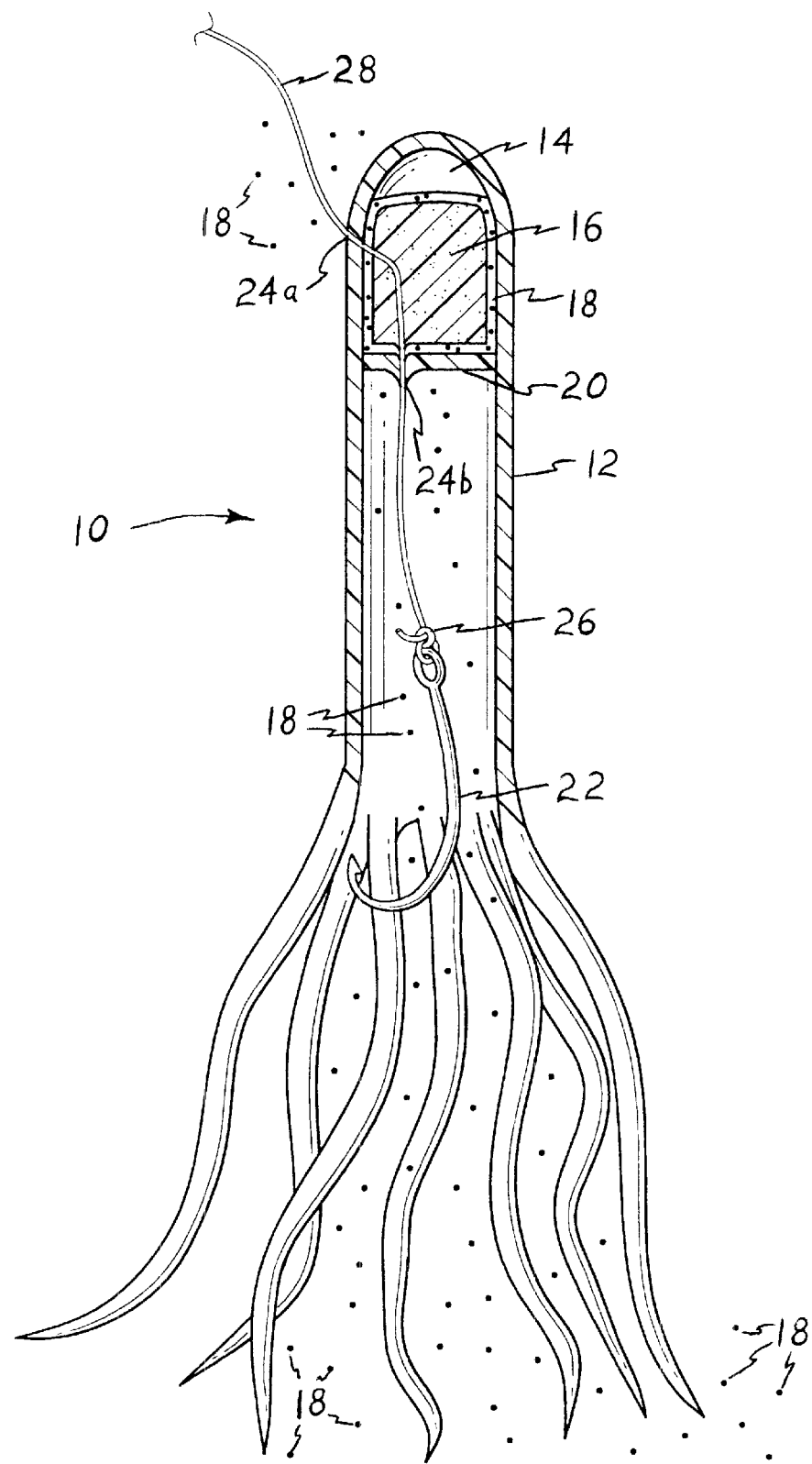
FIG. 1 is an elevation view in section of the present disposable, buoyant scented lure, showing its general features and operation.

FIG. 1 of the drawings provides a side elevation view in section of a first embodiment of the present fishing lure 10, illustrating the internal structure and components thereof. The lure 10 is molded, cast, or otherwise formed of a soft, flexible, resilient plastic material, such as a vinyl polymer. The specific nature of the material is not critical, so long as it provides the softness and flexibility required to allow the lure to flex and move as it is affected by currents as it moves in the water. This adds realism to the lure, making it more closely resemble a moving insect, small aquatic creature, etc., to a fish, once the fish has approached sufficiently closely. It is also important that the selected material be relatively inexpensive, as the present lure is intended for only a single use, i.e., session or outing of fishing, and may be discarded when the fishing activity (perhaps only one or a few casts, or perhaps an entire day) has been completed.

The lure 10 includes a body portion 12 having a hollow scent and flotation element chamber 14 therein. This chamber 14 may extend for substantially the length of the body portion 12, but includes at least the forward portion thereof. A flotation element 16 is inserted into the chamber 14, in order to provide the desired buoyancy for the present lure 10. The flotation element 16 preferably comprises a relatively small volume of closed cell foam plastic material, in order to maintain its buoyancy when punctured by a fish hook, as explained further below. A suitable lubricants may be used as required to aid in the insertion of the flotation element 16 into the lure chamber or cavity 14.

A fish attractant scent material 18 (represented in FIG. 1 by the envelope surrounding the float element 16 within the chamber 14, and by the small dots being dispersed in FIGS. 1 through 4 of the drawings) is placed within the flotation element and scent chamber 14. This fish attractant scent material 18 is selected from any of a number of well known natural and synthetic fish attractants, such as cod liver oil, menhaden oil, oils from other oily fish, or various scents or oils from either natural or synthetic sources. The specific fish attractant substance 18 is not critical, and in fact a variety or combination of such materials may be provided in different lures 10, depending upon the type of fish being sought, the conditions and fishing environment, etc.

The flotation element 16 and fish attractant scent material 18 are hermetically sealed within the chamber 14 at the time of manufacture of the present lure 10, by encapsulating the float element 16 and scent material 18 within the chamber by a seal 20 which is placed across the otherwise open end of the chamber 14. This seal 20 is preferably formed of the same plastic material as that used for the rest of the lure 10, and may be poured, molded, cast, or otherwise formed in place within the lure body 12 to seal the flotation element 16 and scent material 18 therein. Using the same type of plastic material for both the lure body 12 and seal 10 results in the seal forming an integral, unitary, monolithic structure, blending with the remainder of the lure 10.

As the plastic used for the lure 10 and seal 20 are impervious to the scent material 18, the scent material 18 cannot leak from the lure chamber 14 unless the chamber 14 is penetrated in some manner. This assures that the present lure 10 will retain all of the scent material 18, and associated scent, therein until the angler desires to release the scent at the time the lure 10 is to be used. Thus, the angler is protected from any undesirable odors permeating his or her tackle box, apparel, or other articles, before the present scented lure 10 is actually used. This also maintains the scent material 18 at its full strength, as it cannot dissipate from any pores, passages, or other openings through the wall of the lure body 12, and thus retains its full effectiveness when actually used.

The lure 10 is readied for use by passing a fish hook 22 through the flotation and scent chamber 14 of the device. The hook 22 will of course form a first opening or passage 24a where it is inserted, and a second opening or passage 24b where it passes from the flotation and scent chamber 14 or other portion of the lure body 12. While the specific positioning of the hook 22 may not be critical, it is important that it pass through at least a portion of the chamber 14 in order to provide the required fish attractant scent release passages 24a and 24b necessary to allow the scent material 18 to dissipate from the chamber 14. The hook 22 may be inserted through the forward side area of the lure body chamber 14 and pass outwardly through the seal 20, as shown, or may be installed through some other portions of the chamber 14 as desired.

The resilience of the soft polyvinyl (or other) material of which the present lure 10 is formed, causes it to distend and close about the shank of the hook 22 as the hook 22 is inserted through the lure 10 material. However, the conventional barbed tip of the hook 22, along with the relatively wider eye and the knot (or other fastener) securing the hook or lure attachment end 26 of the leader 28 or fishing line to the hook 22, results in further distending and opening of the two passages 24a and 24b as the hook 22 is passed therethrough. Also, while only a single hook 22 is shown in the drawings, it should be noted that one or more additional hooks may be installed in or through the lure 10, if desired.

The scent chamber 14 of the present lure 10 is completely sealed at the time of manufacture and until such time as an angler wishes to use the lure 10, as noted further above. When the lure 10 is to be used, the angler need only take a bare hook, attach a leader to the hook, and use the hook to penetrate the scent and float chamber 14 of the lure 10, generally as shown in FIG. 1. The procedure is much like that used for baiting a fish hook using natural live bait, such as minnows, worms, anchovies, etc. Once the hook 22 has been installed in the present lure 10 to secure the lure 10 to the fishing line and to release the scent material 18 gradually from the lure 10, the angler need only cast or drop the lure 10 into the water and begin to fish. The scent provided by the present lure 10 attracts fish from some distance away, once the scent begins to drift through the water, with the appearance of the lure 10 providing further attraction as the fish approaches.

The present buoyant scented lure 10 may be used in a variety of different fishing techniques, as desired. The present lure 10, with its scent emissions, is particularly well suited for attracting fish in relatively dark and/or murky waters, characteristic of the environment in which both small mouth and large mouth bass are found, as well as other popular game fish. Fish in such environments depend heavily upon the sense of smell to detect food from some distance away, as vision is likely obscured due to the murkiness of the water, as well as plant life, etc. growing from the bottom of the body of water, where the fish tend to remain near the bottom. Accordingly, FIGS. 2 through 4 of the drawings illustrate various fishing tackle assemblies with which the present lure 10 may be used, to position the lure at some predetermined depth relative to the surface or bottom of a body of water.

Figure 2:
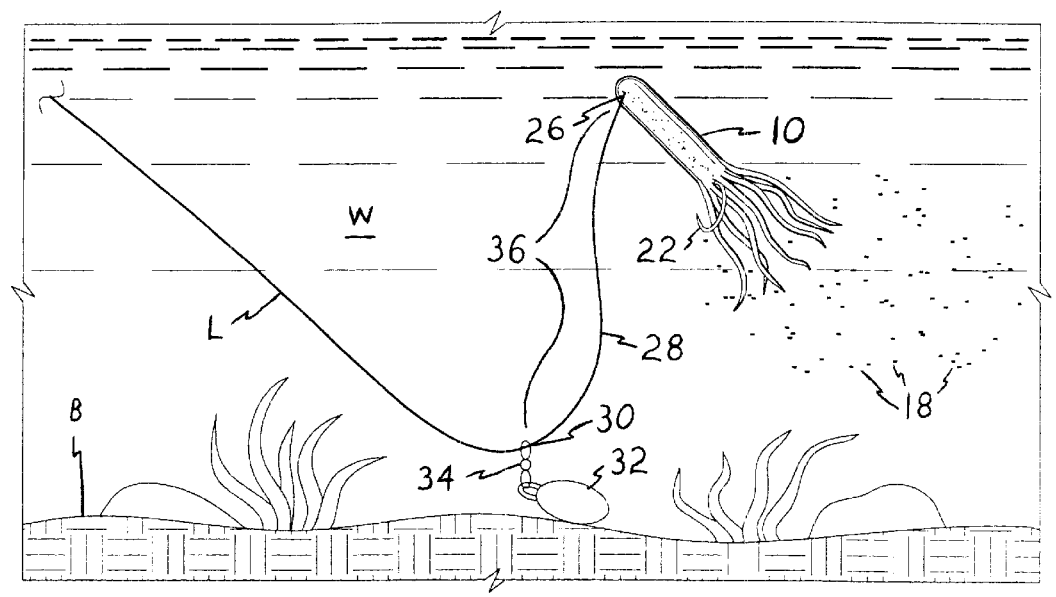
FIG. 2 is an environmental elevation view of a fishing tackle assembly which may be used to position the present lure at a predetermined distance above the bottom of a body of water.

In FIG. 2, the lure 10 is shown attached to the hook or lure attachment end 26 of the leader 28, with the opposite fishing line attachment end 30 of the leader 28 having at least one sinker 32 or other weight attached thereto. The leader 28 may have its line attachment end 30 secured to a fishing line L by means of a swivel snap 34, or other suitable means as desired. Alternatively, the fishing line L may comprise a continuous length from above the water to the lure 10, if so desired. However, it is important that the leader 28, or fishing line L, define a predetermined length 36 between the sinker attachment point (which may be the fishing line attachment end 30 of the leader 28) and the hook attachment end 26.

The length 36 of the leader 28 between the fishing line or sinker attachment point or end 30 and the hook or lure attachment end 26, defines the height above the bottom B of the body of water W at which the present buoyant lure 10 will be positioned, using the tackle assembly of FIG. 2. The sinker 32 or other weight rests upon the bottom B of the body of water W, with the buoyancy of the lure 10 causing the lure 10 to float toward the surface to the extent permitted by the length 36 of the leader 28. Thus, the angler may adjust the length 36 of the leader 28 between the hook or lure attachment end 26 and the sinker or fishing line attachment end 30, to suspend the lure 10 at the desired height or level above the bottom B of the body of water W according to the length 36 of the leader 28. This also has the advantage of keeping the hook 22 of the lure 10 well clear of weeds, snags, and other obstructions on the bottom B, as well.

Figure 3:
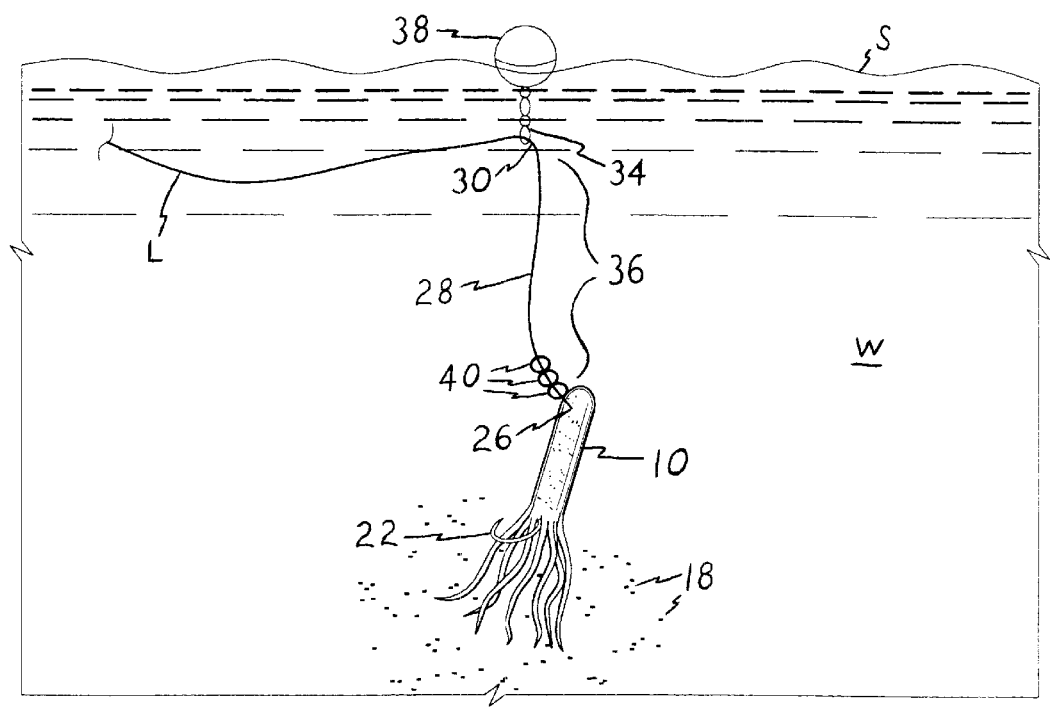
FIG. 3 is an environmental elevation view of a float and weight assembly which may be used to position the present buoyant lure at a predetermined distance below the surface of the water.

FIG. 3 illustrates another variation in the tackle assembly which may be used with the present lure 10, for suspending the lure 10 a predetermined distance below the surface S of the body of water W. In FIG. 3, a float 38 is attached to the fishing line attachment end 30 of the leader 28, or alternatively to the fishing line L at a predetermined distance from the lure 10. One or more sinkers (e.g., split shot 40, etc.) is/are attached to the leader 28 adjacent the lure or hook attachment end 26 of the leader 28, serving to overcome the buoyancy of the lure 10 with its buoyant element 16 therein.

The tackle assembly of FIG. 3 is placed in the water W, with the weighted lure 10 sinking in the water W due to the weight of the sinker(s) 40 attached to the leader 28 adjacent the lure 10. However, the float 38 attached to the opposite end 30 of the leader 28 (or to a predetermined point along the fishing line L, as desired) prevents the lure 10 and sinker(s) 40 from settling to the bottom of the body of water W. This suspends the lure 10 at a predetermined depth below the surface S, according to the length 36 of the leader 28 between the lure and hook attachment end 26 and the opposite fishing line and float attachment end 30 thereof.

Figure 4:
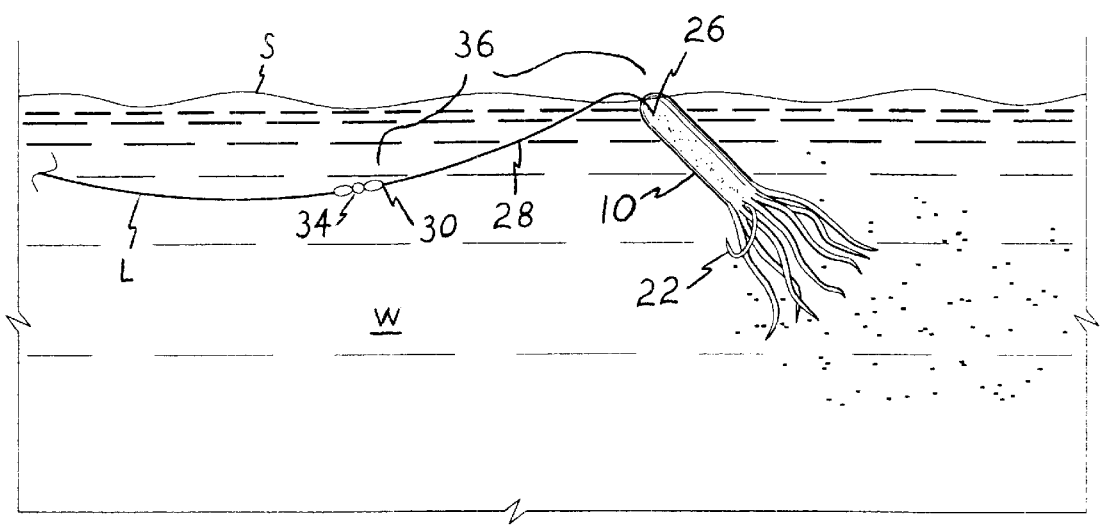
FIG. 4 is an environmental elevation view illustrating the use of the present lure on the surface of the water.

FIG. 4 illustrates another alternative fishing tackle assembly for the present lure 10, in which the lure 10 rests upon the surface S of the water W. As the present lure 10 is buoyant, no additional float means is required, and no weight or sinker means is desired, as the tackle assembly of FIG. 4 is intended to float the lure 10 on the surface S of the water W. In FIG. 4, the lure 10 is connected directly to the leader 28, with the opposite fishing line attachment end 30 of the leader 28 being connected to the fishing line L, e.g., by a swivel snap connector 34 or other suitable connector means as desired. Alternatively, the fishing line L may be connected directly to the hook 22 through the lure 10, if so desired. The configuration illustrated in FIG. 4 allows the present buoyant lure 10 to rest upon the surface S of the water W, to attract any fish which may prefer to feed at or close to the surface S.

Figure 5:
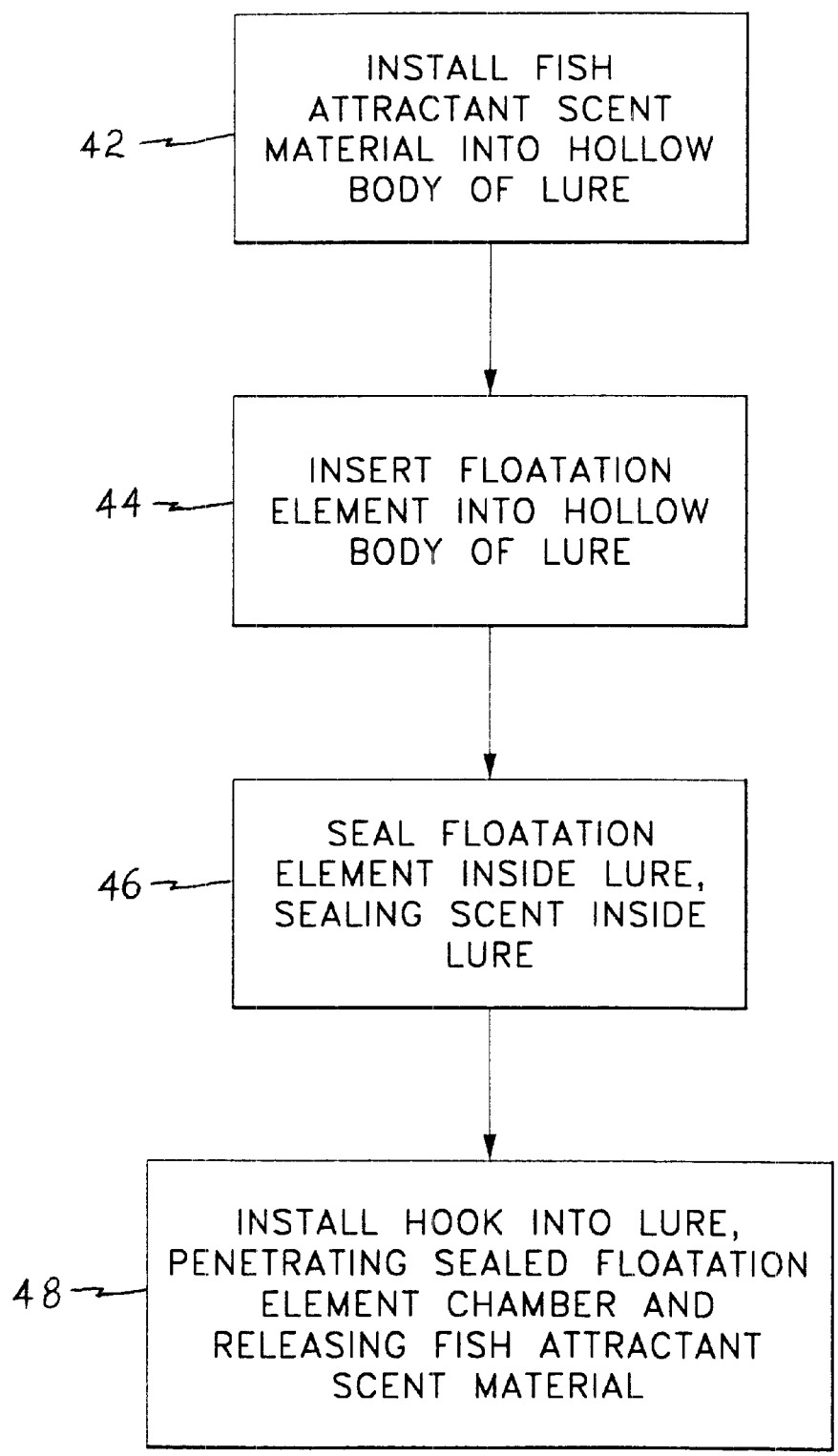
FIG. 5 is a flow chart, briefly describing the steps in the process of manufacture and use of the present buoyant, scented lure.

FIG. 5 of the drawings provides a basic flow chart illustrating the basic steps in the method of manufacture and use of the present buoyant scented lure 10 of FIGS. 1 through 4. The first step 42 essentially describes the installation of the fish attractant scent material 18 into the hollow body chamber 14 of the lure 10, after the lure 10 has been cast, molded, or otherwise formed, generally as known in the art and described further above. The fish attractant material 18 need not comprise a very great amount; only a few drops are required. Such materials are generally relatively inexpensive, and the small quantity required, adds very little to the cost of manufacturing the present disposable lure 10.

After the scent material 18 has been placed within the scent and buoyancy chamber 14 of the lure 10 in accordance with the first step 42 of FIG. 5, the flotation element 16 may be inserted therein. A light oil (e.g., mineral oil, etc.) may be used to coat the flotation element 16, to facilitate insertion of the float 16 into the cavity 14 of the lure 10, with its relatively high friction surface. Alternatively, the float 16 may be coated with a fish oil which may serve as a fish attractant scent material 18 as well. However, it is preferred that such a fish attractant oil not be applied to any portion of the lure 10 (including the portion of the internal chamber 14 which extends from the closed forward end, where the float 16 and fish attractant 18 are placed), in order to avoid any undesired scent from such materials disposed upon any of the unsealed portion of the lure 10.

The third step 46 of FIG. 5 generally indicates the sealing of the flotation element and scent containment chamber 14 of the lure 10. A plug of material 20 may be inserted into the chamber 14, behind the scent material 18 and float element 16 previously placed therein. Preferably, the plug or seal 20 is formed of the same material as the remainder of the lure 10, and is chemically bonded or heated to bond with the interior walls of the hollow body 12 of the lure 10, to form a homogeneous, hermetically sealed structure which prevents the escape of the scent material 18 therefrom. These various steps, along with the manufacture of the lure 10 itself, are accomplished at the time of manufacture of the present invention. Alternatively, the lures 10 may be obtained from another source of manufacture, and modified according to the steps 42 through 46 of FIG. 5, described in detail above.

The final step 48 illustrated in FIG. 5, basically describes the procedure involved for use of the present lure 10 after purchase by an angler. The angler need only ready a hook 22 and leader 28 on the end of a fishing line L (or alternatively secure the hook 22 directly to the end of the line L, if so desired). The angler then imbeds the hook 22 through the forward end or side of the hollow float and scent chamber 14, penetrating the portion of the chamber 14 containing the fish attracting scent material 18. The hook 22 is then worked through another side wall portion, or perhaps through the seal 20 within the chamber 14, and outwardly from the lure body 12, preferably trailing the body 12 slightly and concealed at least somewhat by other lure structure.

The penetration of the hook 22 through the lure body chamber 14, results in an entrance and an exit passage, respectively 24a and 24b, being formed through the chamber 14. The enlargement of these passage 24a and 24b by the hook barb, eye, and attachment passing therethrough, results in sufficient width of the passages 24a and 24b to allow some seepage or dispersion of the scent attractant material 18 through the passages 24a and 24b, past the leader 28 which passes through the two passages 24a and 24b. The angler then places the lure 10 into the water W, after placing a sinker(s) or float(s) along the leader 28 as desired. The fish attractant scent material 18 is slowly released from the lure 10 and into the water W by means of the passages 24a and 24b formed during the installation of the hook 22 in the lure 10, thereby attracting any fish which may be in the area.

The angler may place various combinations of weights or sinkers or floats on the leader 28 (or on the fishing line L), as described further above. If the angler desires only to fish on the surface S of the water W, he/she need only attach the present lure 10 directly to the leader 28 or fishing line L. The buoyancy of the present lure 10 assures that it will remain on the surface S of the water W as desired, essentially as shown in FIG. 4 of the drawings.

If the angler desires to position the present lure 10 at some predetermined distance above the bottom B of the body of water W, as shown in FIG. 2 of the drawings, he or she need only attach a sinker 32 or other weight along the leader 28 (or along the fishing line extending from the lure 10, if no leader is used), at a distance 36 from the lure 10 corresponding to the height above the bottom B desired for the lure 10. When this tackle assembly is placed in the water W, the sinker 32 or weight sinks to the bottom B, with the buoyancy of the lure 10 causing it to float upwardly to the limit defined by the length of the leader 28 from the sinker 32 to the lure 10. Thus, an angler may position the present buoyant lure 10 at any depth above the bottom B of the body of water, as desired.

The present lure 10 may also be positioned at a predetermined depth below the surface S of the water W as desired, in accordance with the assembly illustrated in FIG. 3. The angler need only attach sufficient weight (sinkers 40, etc.) to the leader immediately adjacent the lure 10, and a float 38 to the leader at the distance from the lure 10 corresponding to the depth desired for the lure 10. The sinkers 40 hold the otherwise buoyant lure 10 below the surface, sinking to the depth limited by the length 36 of the leader 28 extending from the float 38 residing upon the surface S of the water W.

When the angler has determined that the fish attractant scent material 18 has dissipated from the lure 10 to the extent that it is no longer effective, he or she may reel in the lure 10, remove the hook 22 therefrom, and discard the original lure 10. The hook 22 may then be installed in a fresh lure 10, and fishing resumed as desired. Alternatively, the angler may have obtained a series of the present lures 10, with some of the lures 10 having different fish attractant scent material(s) 18 therein than others. The angler may determine that a specific scent material may be more effective than another, for a given type of fish and under certain circumstances or conditions. Accordingly, the angler may readily change lures 10 to select the desired scent attractant material, according to the conditions and type of fish sought.

In conclusion, the present disposable, buoyant scented lure provides a series of significant advantages for the angler over various lures of the prior art. The complete sealing of the scent material within the lure body at the time of manufacture of the lure, assures all who may have occasion to handle the present lure that the scent contained therein cannot escape and contaminate the adjacent environment before the lure is used. Yet, the scent is easily and readily released from the lure at the time of use, without requiring any additional steps or actions on the part of the angler, other than installing the lure on a hook. The act of installing the hook in the lure at the time of use, automatically punctures the scent containment area of the lure to release the scent therefrom to attract fish as desired.

The present lure is extremely economical to manufacture, and may be economically disposed of when the release of scent therefrom is no longer effective. The present lure, with its buoyancy, lends itself to use with a variety of relatively simple fishing tackle assemblies enabling the lure to be positioned at some predetermined distance above the bottom of a body of water, without need for a complex wire frame to support the lure above the bottom, as is conventionally done in the prior art. The present lure may also be suspended at some distance below the surface, merely by adding appropriate sinkers to the leader or line at the desired distance from the lure.

It will be appreciated that the present lure may take on virtually any external appearance or configuration desired, so long as a hollow cavity or chamber is provided for the installation of a flotation device and scent material. U.S. Pat. No. 4,530,179 issued to Eugene T. Larew on Jul. 23, 1985, titled "Salt Impregnated Fishing Lure," and U.S. Pat. No. 4,993,183 issued to Robert G. Carver on Feb. 19, 1991, titled "Banana Oil Impregnated Fishing Lures," each illustrate a wide variety of different lure shapes which may be molded or formed from a soft plastic material. The above cited disclosures were discussed further above in the Description of the Related Art, and are incorporated herein by reference. Accordingly, the present economically disposable, buoyant, scented fishing lure will find great favor among anglers who desire to improve their catch while simultaneously simplifying the fishing task.

It is to be understood that the present invention is not limited to the embodiments described above, but encompasses any and all embodiments within the scope of the following claims.

I claim:

1. A disposable, buoyant, scented fishing lure comprising:
    a lure body formed of a soft, resilient, economically disposable plastic material;
    said lure body having a hollow scent and flotation element chamber defined therein;
    a fish attractant scent material, disposed within said lure body chamber;
    a flotation element disposed within said lure body chamber; and
    a hermetic seal disposed across said lure body chamber, sealing said fish attractant scent material and said flotation element therein prior to use.

2. The disposable, buoyant, scented fishing lure according to claim 1, further including:
    at least one fish hook removably installed therein, penetrating said lure body chamber during installation; and
    at least two fish attractant scent release passages extending from said lure body chamber and passing through said lure body, and defined by said fish hook penetrating said lure body chamber, whereby said fish attractant scent material is slowly released from said lure body chamber through said at least two fish attractant scent release passages when said lure body is in use.

3. The disposable, buoyant, scented fishing lure according to claim 1, wherein said hermetic seal is formed integrally with said lure body, as a unitary, monolithic structure therewith.

4. The disposable, buoyant, scented fishing lure according to claim 1, wherein said lure body is formed of a polyvinyl plastic material.

5. The disposable, buoyant, scented fishing lure according to claim 1, wherein said flotation element is formed of a closed cell foam material.

6. The disposable, buoyant, scented fishing lure according to claim 1, wherein said fish attractant scent material is selected from the group consisting of natural fish oils including cod liver oil, menhaden oil, oils from other oily fish, synthetic oils and synthetic scents.

7. A fishing tackle assembly, comprising:
    a disposable, buoyant, scented fishing lure, formed of a soft, resilient, economically disposable buoyant plastic material;
    said fishing lure comprising a lure body having a hollow scent and floatation element chamber defined therein;
    a fish attractant scent material, disposed within said chamber;
    a floatation element disposed within said chamber;
    at least one fish hook removably installed in said fishing lure, and penetrating said chamber during installation;
    at least two fish attractant scent release passages extending from said lure body chamber and passing through said lure body, and defined by said at least one fish hook penetrating said lure body chamber, whereby said fish attractant scent material is slowly released from said lure body chamber through said at least two fish attractant scent release passages when said lure body is in use; and
    a leader having a fish hook attachment end secured to said at least one fish hook, a fish line attachment end opposite said fish hook attachment end, and with each said end defining a leader length therebetween.

8. The fishing tackle assembly according to claim 7, further including a hermetic seal disposed across said chamber, sealing said fish attractant scent material and said flotation element therein prior to use.

9. The fishing tackle assembly according to claim 8, wherein said hermetic seal is formed integrally with said lure, as a unitary, monolithic structure therewith.

10. The fishing tackle assembly according to claim 7, wherein said lure is formed of a polyvinyl plastic material.

11. The fishing tackle assembly according to claim 7, wherein said flotation element is formed of a closed cell foam material.

12. The fishing tackle assembly according to claim 7, wherein said fish attractant scent material is selected from the group consisting of natural fish oils including cod liver oil, menhaden oil, oils from other oily fish, synthetic oils and synthetic scents.

13. The fishing tackle assembly according to claim 7, further including a weight attached to said fish line attachment end of said leader, whereby when said lure is placed in a body of water, said lure is buoyantly suspended a predetermined distance above the bottom of the body of water according to said length of said leader, with said weight resting upon the bottom of the body of water.

14. The fishing tackle assembly according to claim 7, further including:
    at least one weight attached to said fish hook attachment end of said leader, overcoming buoyancy of said flotation element; and
    a float attached to said fish line attachment end of said leader, whereby when said lure is placed in a body of water, said lure is suspended a predetermined distance below the surface of the body of water by means of said at least one weight and according to said leader length.

15. A method of making and using a fishing lure and tackle assembly, comprising the steps of:
    (a) forming a disposable, buoyant, scented fishing lure, of a soft, resilient, economically disposable plastic material;
    (b) further forming a hollow scent and flotation element chamber in said fishing lure;
    (c) placing a fish attractant scent material, within the chamber;
    (d) placing a flotation element within the chamber; and
    (e) installing a hermetic seal disposed across the chamber, thereby sealing the fish attractant scent material and the flotation element therein prior to use.

16. The method of making and using a fishing lure and tackle assembly according to claim 15, further including the steps of:
- (a) forming the hermetic seal integrally with the lure, as a unitary, monolithic structure therewith;
- (b) forming the lure of a polyvinyl plastic material;
- (c) forming the flotation element of a closed cell foam material; and
- (d) selecting the fish attractant scent material from the group consisting of natural fish oils including cod liver oil, menhaden oil, oils from other oily fish, synthetic oils and synthetic scents.

17. The method of making and using a fishing lure and tackle assembly according to claim 15, further including the steps of:
- (a) removably inserting at least one fish hook into the lure, and penetrating the chamber with the fish hook;
- (b) forming at least two fish attractant scent release passages extending from the chamber and passing through the lure body, and defined by the fish hook penetrating the lure body chamber;
- (c) placing the lure in a body of water; and
- (d) releasing the fish attractant scent material from the chamber through the at least two fish attractant scent release passages.

18. The method of making and using a fishing lure and tackle assembly according to claim 17, further including the steps of:
- (a) providing a leader having a fish hook attachment end secured to the at least one fish hook, a fish line attachment end opposite the fish hook attachment end, and with each end defining a leader length therebetween; and
- (b) attaching the fish hook attachment end of the leader to the at least one fish hook.

19. The method of making and using a fishing lure and tackler assembly according to claim 18, further including the steps of:
- (a) attaching a weight to the fish line attachment end of the leader;
- (b) placing the buoyant lure in a body of water; and
- (c) suspending the buoyant lure a predetermined distance above the bottom of the body of water, according to the leader length.

20. The method of making and using a fishing lure and tackle assembly according to claim 18, further including the steps of:
- (a) weighting the lure by attaching at least one weight to the fish hook attachment end of said leader, and overcoming buoyancy of the flotation element;
- (b) attaching a float to the fish line attachment end of the leader;
- (c) placing the weighted lure in a body of water; and
- (d) suspending the weighted lure a predetermined distance below the surface of the body of water, according to the leader length.

* * * * *